Nov. 12, 1968   E. E. STEPHENSON   3,410,697
LAMINATED CLOSURE FOR FOOD TRAYS HAVING HEAT-RETRACTABLE WINDOW
Filed Feb. 12, 1965   2 Sheets-Sheet 1
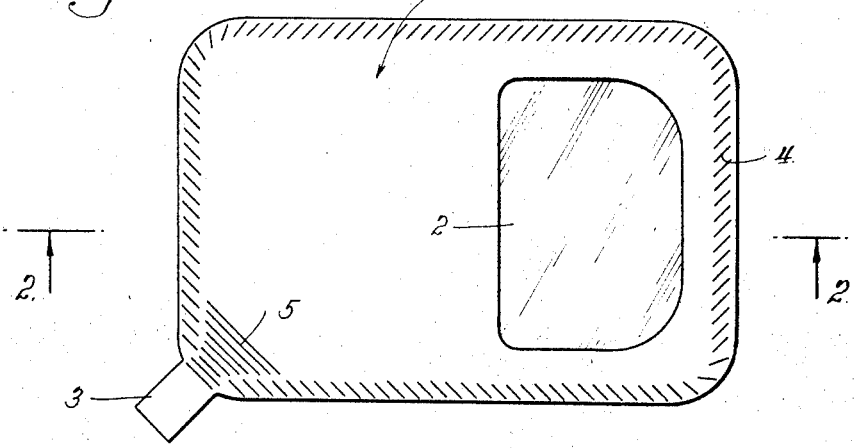
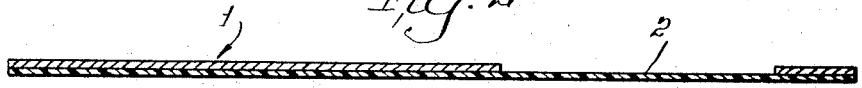
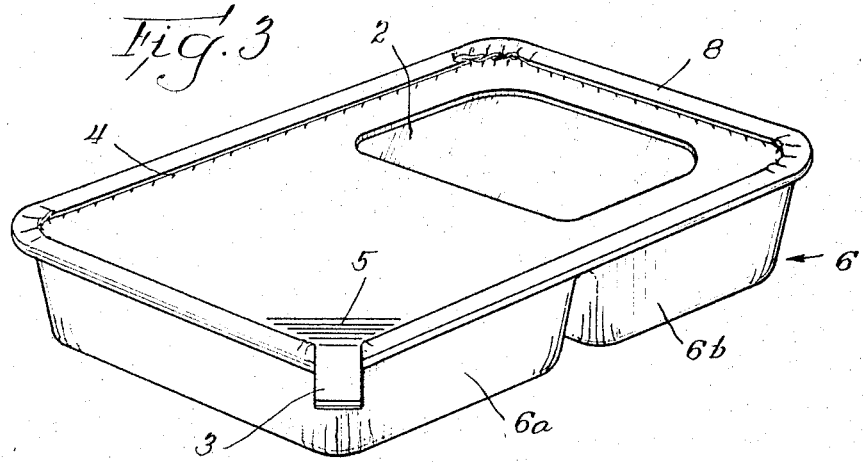
Inventor
Edward E. Stephenson
By
[signature]
Att'y.

Inventor
Edward E. Stephenson

United States Patent Office 3,410,697
Patented Nov. 12, 1968

3,410,697
LAMINATED CLOSURE FOR FOOD TRAYS HAVING HEAT-RETRACTABLE WINDOW
Edward E. Stephenson, Richland, Mich., assignor, by mesne assignments, to Brown Company, a corporation of Delaware
Filed Feb. 12, 1965, Ser. No. 432,084
18 Claims. (Cl. 99—171)

ABSTRACT OF THE DISCLOSURE

A food container having a complementary closure member comprising a sheet-form member having an opening therein and an exposed transparent film secured to the sheet-form member and covering the opening, the film being formed of a synthetic plastic material which fractures and retracts at oven temperatures, thereby enabling the container to be placed in an oven in sealed condition, the transparent film subsequently fracturing and retracting at the oven temperature, thus permitting the food positioned under the film to be heated to a crisp state.

---

This invention relates to containers and is more particularly concerned with food containers and with an improved closure for such containers.

Containers are used for many purposes, including packaging and serving prepared foods, and particularly prepared foods which may be stored in cold or frozen condition and subsequently warmed in preparation for eating. Such containers generally comprise a container body, as for example a tray of a suitable material such as aluminum or other metal foil, and a closure for the top of the tray. In order to free the modern housewife of some of the drudgery involved in preparing dinner for the family and to permit her to utilize her time for useful and educational interests or activities, including television programs, the food processing and packaging industry has provided the housewife with packaged pre-cooked dinners, sometimes known as TV-dinners. Such dinners are commonly packaged in compartmentalized trays having a top closure, and containing courses such as beef, chicken, or fish in one compartment and other courses, such as vegetables and fried potatoes, in other compartments. The food is generally pre-cooked and need only be warmed for serving. However, when different foods requiring different types of heat treatment are packaged in the same container, it would be desirable to be able to heat each kind of food to the required temperature and moisture condition, i.e., to "cook" the food to the desired degree. Such is the case, for example, when foods such as chicken or fish comprising the main course are packaged together with other foods or side dishes such as fried potatoes. Here the main course food need only be warmed to a suitable serving temperature and should retain its moisture. However, the fried potatoes should be heated to a higher temperature under desiccating conditions in order to brown the potatoes and make them crisp. Such diverse treatments have not been obtainable simultaneously with the ordinary types of packaging known in the art.

It is accordingly an object of the invention to provide a closure for containers, and particularly food containers, which has excellent mechanical strength. It is a further object to provide a closure which can withstand the temperatures normally used for warming foods packaged in containers of the type to be utilized with the closures of the invention. It is an additional object to provide a closure and a food package utilizing such a closure having a window which serves to protect the food over which it is positioned during storage and shipping, but which window will be automatically retracted when the package is placed in an oven for warming or cooking, thus permitting the food immediately below the window, as for example fried potatoes, to reach a high temperature than the food which is immediately below the protective portion of the closure. The accomplishment of the foregoing and additional objects will become more fully apparent hereinafter.

According to the invention a closure member for a food container structure is provided having a window framed throughout its entire periphery by the paperboard or other sheet form material of the closure member, and which window is covered with a heat-retractable transparent plastic film through which at least a portion of the food is visible. Where two or more foods are packaged in the container, only the food which must be heated under higher temperature and desiccating conditions, as for example to make it more palatable and less mushy, is placed under the window. Among such foods are fish sticks and french fried potatoes. On the other hand, some foods such as stews and foods prepared with sauce should retain a high moisture content. These foods are warmed under lower temperature and moisture-retaining conditions as a result of being protected by the portion of the closure member which is not provided with a window. The transparent film is prepared from a plastic material which is heat-retractable. As a result, when a food container utilizing the closure is placed in an oven, the film will retract under the influence of the elevated temperature, thus exposing the food immediately below the opening to the direct heat from the oven. Consequently, the exposed food is heated to a higher temperature and with a greater loss of moisture than the food which is protected by the covered or closed part of the closure member. After the package has been sufficiently heated for serving, the entire closure may be readily removed, as by means of a pull tab provided at the edge thereof.

The invention in its preferred embodiment is illustrated by the accompanying drawings in which:

FIG. 1 is a top plan view of a closure member according to the invention.

FIG. 2 is a cross-section of the closure member.

FIG. 3 is a perspective view of a covered and sealed food container.

Reference is now made to the accompanying drawings for a better understanding of the invention, wherein all of the parts are numbered and wherein the same numbers are used to refer to corresponding parts throughout.

Figure 4:
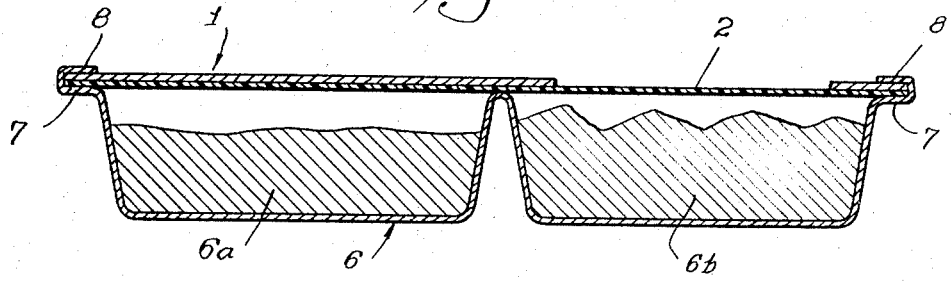
FIG. 4 is a cross-section of the sealed container.
Figure 5:
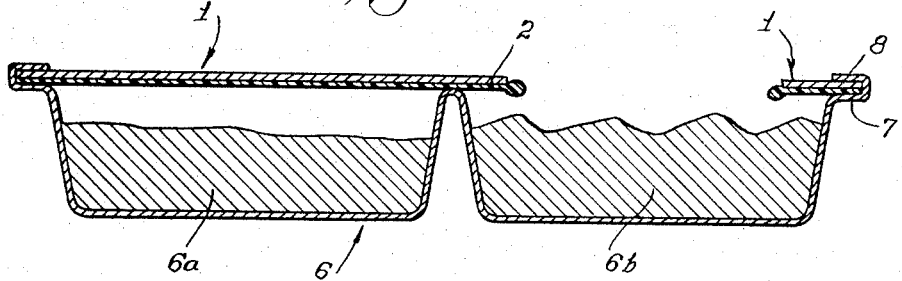
FIG. 5 is a cross-section of the container with the transparent film window in retracted condition.
Figure 6:
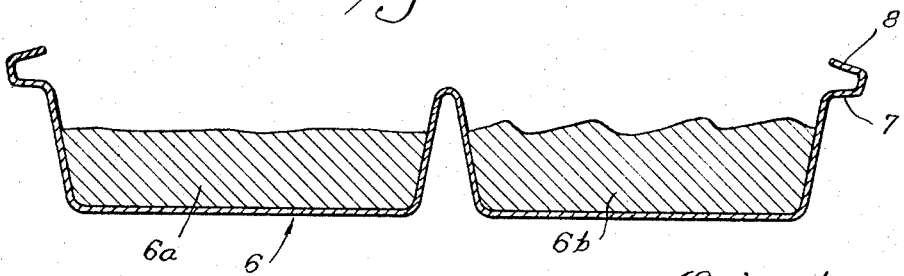
FIG. 6 is a cross-section of the container with the closure member removed.

Referring to FIG. 1, a closure according to the invention is shown comprising an opaque sheet-form member 1 formed from a material such as paperboard. Adhesively affixed to the sheet-form member 1 is a transparent plastic film 2. A pull tab 3 is provided at one corner of the sheet-form member. Angled score lines or slits 4 are provided at the periphery of the sheet-form member and score lines 5 are provided in a corner thereof to permit its ready removal from beneath the crimped-over flange of the container to which it is affixed.

The transparent film should be of a "heat-retractable" material, which term as used herein refers to the property whereby when a plastic film is heated, it will either melt, or soften, to permit the elastic memory of the material to take effect and cause the film to break in the center and retract toward the edges, or otherwise to provide an opening as by decomposition.

The preferred materials for the transparent retractable film are low molecular weight, low density polyethylene and polypropylene having elastic memory. These materials have been found to be ideal since, when a food tray having a retractable window made from this material is placed in an oven preheated to a temperature of about 350–400 degrees F., the film retains its integrity for a period of about one and a half to three minutes during which time the moisture is contained therein. At the end of this period the material generally reaches a temperature sufficient to soften or melt, thus becoming ruptured at the center and gradually retracting towards the edges until substantially the entire film has been removed from the window opening. With the preferred materials, as for example low molecular weight, low density polyethylene, retraction may take place at temperatures of 180° F. or below. This process is accomplished without distorting the package, and without causing molten droplets of the plastic to fall into the food, as occurs when certain other types of plastic materials are used. Although they are not as desirable for various reasons, films may be provided for some purposes from heat retractable polyvinylchloride, polystyrene, and other suitable heat retractable plastic films.

One suitable commercial material is marketed as .0075 inch Poly Treated One Size Type P.O.W.A. low density polyethylene. The material has a minimum density of .924, with a melting index of .7 to 1.5. Among the suitable retractable polypropylene films are those marketed as under the trademark designations Clysar EH 10, Profax BX 100, and Profax B 502. A suitable polystyrene film is Trycite 1000. Although the polystyrene film generally has the desired properties, it has the disadvantage that it sometimes tends to expose the adhesive on the paperboard more than may be desirable. Polyethylene and polypropylene do not suffer this disadvantage.

Among the suitable adhesives for affixing the film to the paperboard are polyvinyl acetate resin emulsions such as Formula No. 331413, and polyvinyl acetate-butyl rubber emulsions.

Any geometric form desired may be used for the retractable window, such as rectangles, circles, triangles and various other figures as well as figures modified by rounding off of corners, or the like.

Although the plastic film may be limited to the area of the window, it is highly desirable to adhere the plastic film to the entire inner surface of the sheet-form member to serve as a moisture-proof barrier for the food generally.

The film may be applied to the sheet-form member by means of a suitable adhesive, and preferably, one which does not melt at the oven temperature. Alternatively, the film, as for example polyethylene, may be extruded directly onto and adhered to the paperboard sheet-form member by well known methods. In either event, the film is considered to be "adhesively secured" to the sheet-form member. A plastic film thickness range of from one half mil (five ten-thousandths of an inch) to two mils is suitable. A film thickness of three-fourths mil is preferred. The present invention provides a package which divests itself of a cover in the areas which must be dried out during a heating cycle, e.g., five to twenty minutes, and which protects the food from overheating and drying out in the remaining zones of the package. In other words, a package results which might be said to "think for itself."

In FIGS. 3 and 4, a covered and sealed container is illustrated, comprising a tray 6 divided into two compartments 6a and 6b, and having a flange 7 at its periphery. A crimped-over margin 8 of the flange 7 engages the periphery of the closure and provides a durable seal. The container shown in FIGS. 3 and 4, when filled with the desired contents and sealed, is stored in the condition shown. When the food contents are to be warmed, the entire unit is placed in a suitable warming means, such as a warming section of an oven, and heated to the desired temperature, generally from 350–400 degrees F. After a period of about one and a half to three minutes, the plastic film fractures at the center and the exposed edges gradually retract to the edges of the opening in the paperboard, exposing the food directly beneath the resulting opening to the heat of the oven. This results in heating the particular food to a greater degree, as for example for browning potatoes, then the food protected by the paperboard sheet-form member proper. Moreover, the exposed food loses moisture more rapidly than the protected food. When the heated container is removed from the oven, the sheet-form member 1 is removed by grasping the pull tab 3 and pulling the entire member out from beneath the crimped-over flange of the container.

The container utilized with the closure of the invention is preferably in the form of a flanged tray having means provided for engaging and securing the closure. It may be fabricated of any one of a variety of materials, such as metal foil, paperboard, plastic, etc. Aluminum foil is one preferred material, plastic another.

The sheet-form member 1 may be fabricated of any suitable material having the necessary mechanical strength and rigidity to withstand the rigors of shipping and storing. Among suitable materials are paperboard, metal foil, plastic, and the like. Paperboard is the preferred material.

Although a container body in the form of a relatively flat tray divided into two compartments has been illustrated and described and is in fact preferred, it is to be understood that containers of various types, shapes and sizes may be utilized with the closure member of the invention. Moreover, although the present food package is provided for packaging two or more different kinds of food, one of which is to be heated to a greater degree and to a greater dryness than the other, the present food package may also be used to package a single material such as fried potatoes or fish sticks, wherein the entire packaged food must be subjected to sufficient heat and desiccating conditions so that the food is properly browned and made crisp. To provide for this, a large window may be provided in the closure member comprising most of the area thereof, the window being surrounded by a narrow frame of the paperboard material of the closure member along its entire periphery.

The closure member of the invention, as well as the combination of the closure member and a complementary container, have a number of advantages over closures and containers commonly used in the art for food products. The paperboard closure provides good protection against crushing or penetration and consequent leakage of the contents. The transparent film, at least when provided over the entire surface of the closure, serves as a moisture-proof barrier. Further, the use of a heat-retractable material for the plastic film permits automatic selective cooking of the contents of the tray. The structure of the closure lends itself extremely well to fabrication by mass production facilities, and it may accordingly be produced at a relatively low cost. The completed package is attractive and provides an excellent seal for the contents thereof.

It is to be understood that the invention is not limited to the exact details of construction, operation, or exact materials or embodiments shown and described, as obvious modifications and equivalents will be apparent to one skilled in the art, and the invention is therefore to be limited only by the scope of the appended claims.

I claim:

1. A container combination for packaging more than one different kind of food comprising a container body, a complementary closure member, and means for securing the periphery of said closure member to the periphery of said container, said closure member comprising a sheet-form member having an opening therein extending over only a part of the area thereof and an exposed transparent film adhesively affixed to said sheet-form member on the inner surface thereof and covering said opening, said film being formed of a heat-retractable plastic material, whereby when said container body and container closure are secured together and said container is placed in an oven maintained at an elevated temperature, said film retracts to exposed said opening.

2. A container combination according to claim 1 wherein said plastic material fractures and retracts at a temperature below about 180 degrees F.

3. A container combination according to claim 1 wherein said heat-retractable plastic material is low molecular weight, low density polyethylene.

4. A container combination according to claim 1 wherein said heat-retractable plastic material is low molecular weight polypropylene.

5. A container combination according to claim 1 wherein said heat-retractable plastic material is low molecular weight polystyrene.

6. A closed container containing a plurality of different foods which are to be collectively heated to different states of temperature and dryness, comprising a container body and a container closure member secured thereto at the periphery thereof, said closure member comprising a sheet-form member having an opening therein extending over only a part of the area thereof and positioned over the food which is to be selectively heated to a greater degree and an exposed transparent film adhesively affixed to the inner surface of said sheet-form member and covering said opening, said film being formed of a heat-retractable plastic material, other food being located below solid areas of said closure member, whereby when said container is placed in an oven maintained at an elevated temperature, said film retracts to expose said opening and to cause the food positioned immediately below said opening to be heated to a greater degree than the food below the remainder of said sheet-form member.

7. A closed container according to claim 6 wherein said plastic material fractures and retracts at a temperature below about 180 degrees F.

8. A closed container according to claim 6 wherein said heat-retractable plastic material is low molecule weight, low density polyethylene.

9. A closed container according to claim 6 wherein said heat-retractable plastic material is low molecular weight polypropylene.

10. A closed container according to claim 6 wherein said heat-retractable plastic material is low molecular weight polystyrene.

11. A method for preparing a plurality of foods for serving while packaged in an initially closed container, at least one of said foods requiring heating under desiccating conditions, said container being provided with a complementary closure member comprising a sheet-form member having an opening therein extending over a portion of the area thereof and positioned over said food, and an exposed transparent film formed of a heat-retractable synthetic plastic material adhesively secured to said sheet-form member and covering said opening, said food requiring heating under desiccating conditions being positioned below said film and other food not requiring desiccating conditions being positioned below a solid area of said closure member, said method comprising heating said food container at a sufficient temperature to cause said film to retract and to expose the food beneath the opening formed thereby, and continuing to heat said container until said unexposed food is heated and said exposed food is cooked to the desired degree.

12. A method according to claim 11 wherein said heat-retractable plastic material is low molecular weight, low density polyethylene.

13. A method according to claim 11 wherein said heat-retractable plastic material is low molecular weight polypropylene.

14. A method according to claim 11 wherein said heat-retractable plastic material is low molecular weight polystyrene.

15. A method for preparing a plurality of foods for serving by heating, at least one of said foods to be heated under desiccating conditions, which comprises packaging said foods in a container and closing said container with a complementary closure member comprising a sheet-form member having an opening therein extending over a portion of the area thereof and positioned over said food, and an exposed transparent film formed of a heat-retractable synthetic plastic material which fractures and retracts at a temperature not greater than about 180 degrees F. adhesively secured to said sheet-form member and covering said opening, said food requiring heating under desiccating conditions being positioned below said film and other food not requiring desiccating conditions being positioned below a solid area of said closure member, heating said closed food container with said transparent film intact at least at said temperature to cause said film to retract and to expose the food beneath the opening formed thereby, and continuing to heat said container until said unexposed food is heated and said exposed food is cooked to the desired degree.

16. A method according to claim 15 wherein said heat-retractable plastic material is low molecular weight, low density polyethylene.

17. A method according to claim 15 wherein said heat-retractable plastic material is low molecular weight polypropylene.

18. A method according to claim 15 wherein said heat-retractable plastic material is low molecular weight polystyrene.

References Cited

UNITED STATES PATENTS 3,158,491  11/1964  Farrell et al. _____ 99—171
3,188,215  6/1965   Snow.

A. LOUIS MONACELL, *Primary Examiner.*

E. A. MILLER, *Assistant Examiner.*